March 28, 1967 — R. S. NEASHAM — 3,311,018
VARIABLE CONTRAST INTERFERENCE VIEWER
Filed April 23, 1965
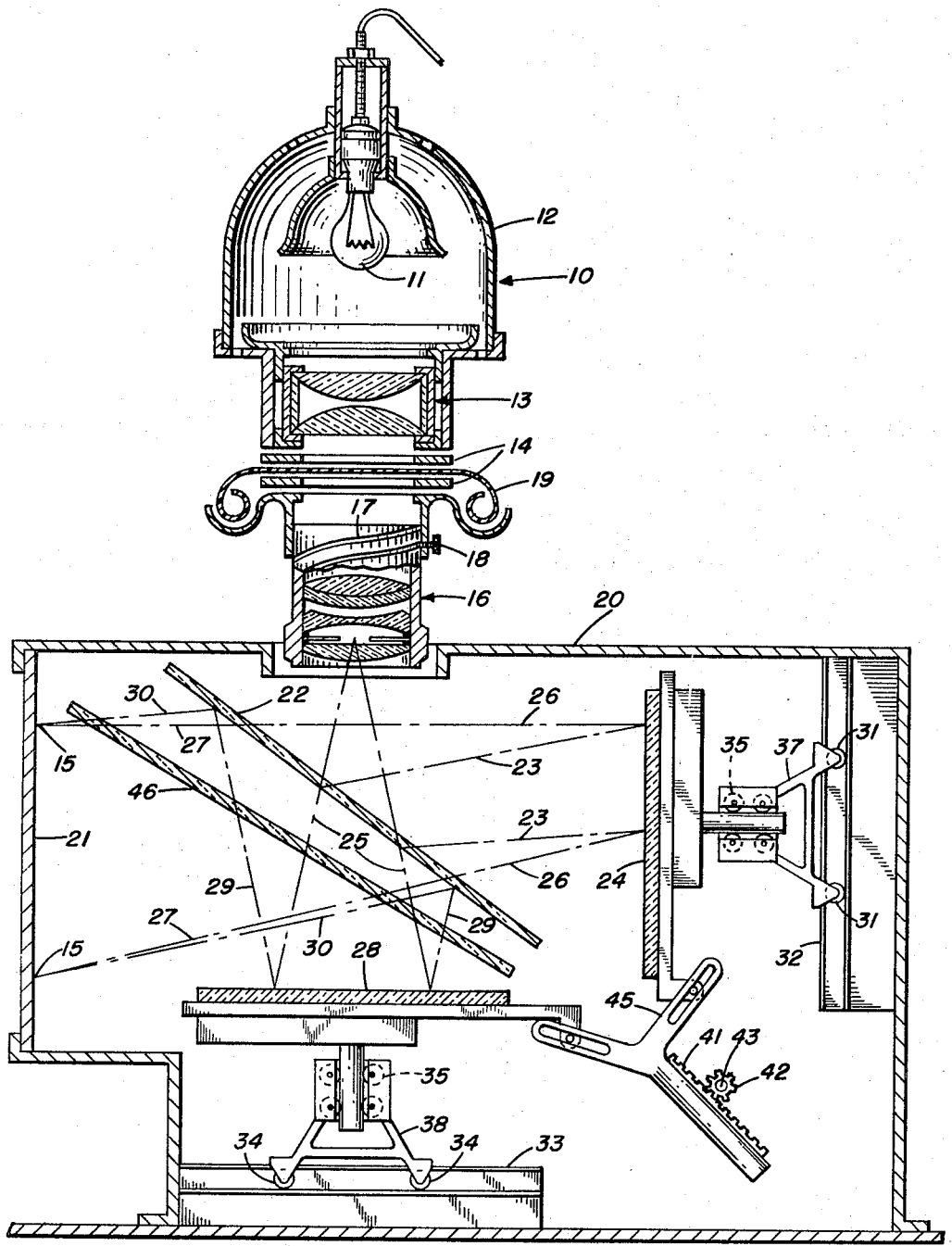
INVENTOR
ROBERT S. NEASHAM
BY
ATTORNEY
AGENT

United States Patent Office 3,311,018
Patented Mar. 28, 1967

3,311,018
VARIABLE CONTRAST INTERFERENCE VIEWER
Robert S. Neasham, 1910 W. Surrey Ave., Phoenix, Ariz. 85029
Filed Apr. 23, 1965, Ser. No. 450,554
6 Claims. (Cl. 88—24)

The invention described herein may be manufactured and used by or for the Government of the United States of America for governmental purposes without the payment of any royalties thereon or therefor.

This invention relates to a photographic system for providing a variable contrast in a viewing system for interpretation of intelligence contained in the photographic image utilized therewith. More particularly, the invention relates to a viewing system utilizing a Michelson interferometer application in a photographic viewing system for enhancement of the gray scale range.

This invention has for its purpose a system which permits a fuller exploitation of photographic records by providing a wider range of gray scales than can be perceived by unaided vision.

In prior art viewing systems, the photographic reproduction to be viewed is illuminated by an incandesced light source and the image is viewed through a lens system providing a desired degree of magnification. The illumination from the incandescent light source is intercepted by a ground glass or opaque glass to provide the diffusion of the light and prevent hot spots and images of the filament of the lamp from becoming apparent in the viewed image. The control of range of illumination is generally controlled by a rheostat or similar device for varying the intensity of the light source. Other methods of illumination control known in the art include the utilization of stepped neutral density filters which are interposed in the light path between the illumination source and the photographic medium to provide a desired degree of attenuation of the illumination. The instant invention is based on the utilization of the principles of the Michelson interferometer and provides the advantage heretofore not obtainable by prior art apparatus in that a variable contrast range for lighter and darker shades may be obtained and which range can be perceived with direct viewing. This increase in the gray scale range is of significant importance in photographic systems used to yield higher resolution at lower gamma and contrast ranges. The instant invention is particularly well adapted for use in photo-interpretation of intelligence obtained from imageable media on a supporting film material such as photographic transparencies and the like, although it is not to be construed as limited thereto. For the same magnification, this system envisions an enchancement of double the contrast for light grays and half the contrast of the darker shades so that the system on an overall basis provides an enhancement of about 200% as compared on an efficiency basis to the systems of the prior art heretofore or now available. The novel inventive concept of the instant invention provides a high order of performance when the apparatus embodiment thereof is used in photo-intelligence centers utilizing the most advanced high acuity photographic techniques and systems. It is not, however, limited to these applications and is equally useful for visual analysis of infrared, radar, X-ray or any other density record in individual or comparative analysis.

In its broader sense, the viewer comprises a light source and a suitable condenser system and film holder of a character well-known in the art. A Michelson interferometer is incorporated therein together with a viewing surface of a nature which may be either visual or real. The apparatus incorporates two primary adjustments for the optical system and hence provides a minimal degree of complexity in actual operation.

It is a feature of the instant invention to provide an improved viewing system for interpretation of intelligence contained in a photographic image medium whereby the gray scale range which may be read out by the human eye is substantially increased over conventional viewing systems heretofore or now in common use.

It is an object of the instant invention to provide an improved photographic viewing system utilizing a Michelson interferometer system for image enhancement.

Another object of the instant invention resides in the provision of photographic viewing apparatus in which a high order of increase in efficiency is obtained when considered with respect to the efficiency of apparatus and systems of the prior art heretofore in common use.

Another object of the instant invention resides in the provision of a simple viewing system for photo-intelligence applications in which a minimum of operating control consistent with optimum operative flexibility are incorporated in the apparatus embodiment of the viewing system.

Other objects, advantages and novel features of the invention will become apparent from the following detailed description of the invention when considered in conjunction with the accompanying drawing wherein:

The figure is a diagrammatic illustration of an optical system embodying the instant invention.

Referring to the figure, a projection system of a conventional nature is indicated generally at 10. The particular light source assembly indicated for purposes of illustration is generally similar to a conventional enlarger. It is to be understood, however, that a projection system of the character similar to those used for motion picture applications may be utilized in instances in which a power feed is desired for sequential presentation of the subject matter carried as an image by the photographic medium. The light source of any suitable nature shown in this instance as an incandescent lamp bulb 11 is connected to an available source of electrical power, not shown. The light source is enclosed in a housing 12 of a character to provide adequate ventilation for the light source contained therein. The condensing lens system indicated at 13 while illustrated as a conventional dual lens condenser is preferably of the Fresnel character for the purpose of minimizing mass and weight of the optical beam condenser system when the photographic medium is of large format. The photographic medium is carried between a conventional sandwich-type film holder and guide assembly 14 to provide registration of the frame thereof with the optical beam path from the light source.

The photographic medium 19 is shown as a strip or roll of transparent film-backed emulsion preferably having a positive image in the emulsion thereof. It is to be understood, however, that the image may likewise be of a heat-produced nature. A suitable objective type lens assembly 16 is carried by a focusing mount arrangement at 17 which may be of a helical screw type, a rack and pinion arrangement, or merely a friction retained sleeve assembly. Likewise, it may incorporate a collapsible bellows system of a conventional nature, if desired. Preferably, it is provided with a locking arrangement indicated at 18 for maintaining the objective lens at its in-focus position. The housing 20 encloses an interferometer system herein to be described and provides a support for the viewing screen 21. The light beam carrying the intelligence obtained from the photographic medium is directed onto a half-surfaced mirror 22 of the interferometer. The rays indicated at 23 are reflected from the reflecting surface thereof onto a vertically disposed mirror or reflection plate 24 while the rays indicated at 25 are permitted to pass through the reflecting plate and be reflected by a second mirror or reflecting plate 28. The rays 26 reflected by the first-mentioned reflecting plate 24 pass through the half-surfaced mirror 22 on their subsequent path of reflection as indicated by the rays 27 to impinge and produce imaging intelligence of a nature acceptable to human vision on the viewing screen at 15. The rays reflected from the second mirror or reflecting plate 28 as indicated by the ray path 29 are reflected from the mirrored surface of the interferometer plate 22 as indicated by the ray path 30 and produce their image at substantially the same point on the viewing screen as do those of the first-mentioned light rays 27. For purposes of illustration, a support structure comprising, for example, rollers 31 caged in a channel-like track 32 permit movement of the vertically disposed mirror 24 in a generally vertical path while the horizontally disposed mirror may be permitted to move in a generally horizontal plane by virtue of the horizontal track 33 and roller 34 arrangement. A roller-bearing arrangement 35 permits horizontal movement of the mirror 24 relative to its carriage 37 which is attached to the rollers 31 and track 32 assembly. A system similar to that provided for the vertical mirror 24 is incorporated for mirror 28. A similar roller-bearing 35 and support or carriage 38 permits vertical movement of the horizontally disposed mirror 28. A suitable coupling device is incorporated for providing unitary movement of the two mirrors in a manner such that their angular position is maintained constant while the respective mirrors are moved closer to or farther away from the half-surfaced mirrors. This may be accomplished by any suitable mechanism of a character known in the art. A rack 41 and pinion 42 arrangement controlled by a knob, not shown, but mounted on the shaft 43 on thet pinion 42 is disposed externally of the housing for convenient operation by the operator of the equipment. A fork actuating member is shown at 45 for purpose of illustration as a means for providing contemporary actuation and movement of the two mirrors and according to a constant predetermined relationship. A correcting plate indicated at 46 is interposed in the light path for correction of the path of the light rays in order to compensate for the slight displacement of the light beam produced by passing from an air medium into a glass medium and then back into an air medium. The use of the corrector plate and the design of the materials of the corrector material is considered to be well known in the art.

Obviously many modifications and variations of the present invention are possible in the light of the above teachings. It is therefore to be understood that within the scope of the appended claims the invention may be practiced otherwise than as specifically described.

What is claimed is:

1. An improved viewing system for increasing the range of the gray scale of a photographic medium possessing image intelligence comprising:
    an enlarger type illumination system for projecting an image to be viewed,
    a viewing screen for observation by an observer,
    a projection lens system for providing a sharply focused image of the intelligence contained by the photoraphic medium upon the viewing screen, the improvement comprising;
    an interferometer device interposed between said projection lens system and said viewing screen in a manner whereby the optical beam of intelligence carrying light is split by a beam-splitting device thereof,
    a first light beam reflection surface so disposed with respect to said beam-splitting device as to reflect the reflected beam from a beam-splitting device which beam is impinging thereon back through a second portion of said beam-splitting device thence onto said viewing screen,
    a second light reflecting surface so disposed with respect to said beam-splitting device as to reflect the transmitted beam from said beam-splitting device and which is impinging on said second reflecting surface, back toward and onto the reverse side of said beam-splitting device for subsequent reflection by said reverse side of said beam-splitting device and onto said viewing screen, and in substantial registration with the beam of light reflected onto and back from said first beam reflecting surface.

2. An improved viewing system of the character of claim 1 further comprising means for providing contemporaneous movement of said first-mentioned beam reflecting surface and said second beam reflecting surface while continuously maintaining a constant mutually perpendicular angular relationship between said reflecting surfaces.

3. A viewing system of the character of claim 2 wherein said last-mentioned means comprises:
    bearing means for providing horizontal movement of said first-mentioned reflecting surface,
    bearing means for providing vertical movement of said second-mentioned reflecting surface,
    guide means for providing vertical movement of said first-mentioned beam reflecting surface,
    guide means for providing horizontal movement of said second-mentioned beam reflecting surface, and means for coordinating all of the movements of said first and second reflecting surfaces.

4. An improved viewing system of the character of claim 3 further comprising:
    means for effecting movement only of a contemporaneous nature from a common actuator controllable from a location exteriorly of a housing for said viewing system for actuation of both of said movable reflecting surfaces by actuation of said means for coordinating all of the movements of said reflecting surfaces.

5. A viewing system of the character of claim 4 further comprising:
    a housing for said interferometer and first and second reflecting surfaces, which further incorporates means for mounting said viewing screen.

6. A viewing system of the character of claim 5 further comprising a correction plate device interposed in the light beam paths of beams which have been passed through said beam-splitting device for correcting projection errors occurring in said light beam paths due to transmission of the light beams from-to glass and air surfaces, respectively.

References Cited by the Examiner

UNITED STATES PATENTS

| | | | |
|---|---|---|---|
| 2,442,396 | 6/1948 | Bubb et al. | 88—14 |
| 2,580,498 | 1/1952 | Ackerlind | 88—14 |

NORTON ANSHER, *Primary Examiner.*

F. L. BRAUN, *Assistant Examiner.*